United States Patent
Kwag et al.

(10) Patent No.: US 12,059,092 B2
(45) Date of Patent: Aug. 13, 2024

(54) COFFEE MAKER

(71) Applicant: LG Electronics Inc., Seoul (KR)

(72) Inventors: Dongseong Kwag, Seoul (KR); Seyoung Woo, Seoul (KR); Imsung Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 582 days.

(21) Appl. No.: 17/223,711

(22) Filed: Apr. 6, 2021

(65) Prior Publication Data
US 2021/0345814 A1  Nov. 11, 2021

(30) Foreign Application Priority Data
May 11, 2020  (KR) .......... 10-2020-0055991

(51) Int. Cl.
*A47J 31/057* (2006.01)
*A47J 31/10* (2006.01)
*A47J 31/24* (2006.01)
*A47J 31/44* (2006.01)
*A47J 31/06* (2006.01)

(52) U.S. Cl.
CPC ............. *A47J 31/057* (2013.01); *A47J 31/10* (2013.01); *A47J 31/24* (2013.01); *A47J 31/4485* (2013.01); *A47J 31/06* (2013.01)

(58) Field of Classification Search
CPC .......... A47J 31/057; A47J 31/10; A47J 31/24; A47J 31/4485; A47J 31/06; A47J 31/0631; A47J 31/4475; A47J 31/465
See application file for complete search history.

(56) References Cited

U.S. PATENT DOCUMENTS

| 2013/0125759 A1* | 5/2013 | Lin ................. A47J 31/44 99/281 |
| 2014/0144330 A1* | 5/2014 | Huang ............. A47J 31/46 99/300 |
| 2015/0075387 A1 | 3/2015 | Lee et al. |
| 2015/0164267 A1 | 6/2015 | Hughes |
| 2016/0324365 A1* | 11/2016 | Pan ................. A47J 31/0631 |
| 2021/0033175 A1* | 2/2021 | Kaufman ........... F16H 19/043 |

FOREIGN PATENT DOCUMENTS

| JP | 2020058404 A | * 4/2020 | .......... A47J 31/0631 |
| KR | 1020130019466 | 2/2013 | |
| KR | 101896838 | 9/2018 | |

OTHER PUBLICATIONS

Extended European Search Report in European Appln. No. 21159021.1, dated Jul. 20, 2021, 6 pages.

\* cited by examiner

*Primary Examiner* — Helena Kosanovic
*Assistant Examiner* — Thao Uyen Tran-Le
(74) *Attorney, Agent, or Firm* — Fish & Richardson P.C.

(57) ABSTRACT

A coffee maker includes an extractor configured to receive ground coffee and water and to extract coffee from the ground coffee, and a dispenser configured to supply water to the ground coffee in the extractor. The dispenser includes an arm that is rotatably disposed vertically above an inlet of the extractor and includes a nozzle configured to supply water to the ground coffee in the extractor, a first actuator configured to rotatably support the arm and to rotate the arm about a center of the inlet along an edge of the inlet, and a second actuator connected to the arm and configured to rotate the arm relative to the first actuator.

19 Claims, 12 Drawing Sheets

COFFEE MAKER

CROSS-REFERENCE TO RELATED APPLICATIONS

Pursuant to 35 U.S.C. § 119(a), this application claims an earlier filing date and right of priority to Korean Patent Application No. 10-2020-0055991, filed on May 11, 2020, the contents of which are incorporated herein by reference in their entirety.

TECHNICAL FIELD

The present disclosure relates to a coffee maker and, more particularly, to a water supply device of the coffee maker.

BACKGROUND

Coffee may be brewed at home in various manners. For example, a coffee maker may extract liquid coffee with water and ground coffee according to a drip or pour-over method among various coffee making methods. In some cases, the coffee maker may have a simple and compact structure and perform a convenient operating method.

In some examples, the coffee maker may include a container for receiving ground coffee and a dispenser for supplying water to the received ground coffee. In some cases, the dispenser may intensively supply water only to a specific portion of the ground coffee. Therefore, ground coffee and hot water may not uniformly contact each other, thereby making it difficult to produce high-quality coffee. The coffee maker may also include a grinder that grinds whole coffee beans and supplies the ground coffee to the container. In some case, the dispenser, particularly, a nozzle of the dispenser, may be clogged by the supplied ground coffee and may not smoothly supply water.

SUMMARY

The present disclosure describes a coffee maker including a dispenser that can uniformly supply water to ground coffee.

The present disclosure also describes a coffee maker including a dispenser that can reduce or preventing clogging of ground coffee.

According to one aspect of the subject matter described in this application, a coffee maker includes an extractor configured to receive ground coffee and water and to extract coffee from the ground coffee, and a dispenser configured to supply water to the ground coffee in the extractor. The dispenser includes an arm that is rotatably disposed vertically above an inlet of the extractor and includes a nozzle configured to supply water to the ground coffee in the extractor, a first actuator configured to rotatably support the arm and to rotate the arm about a center of the inlet along an edge of the inlet, and a second actuator connected to the arm and configured to rotate the arm relative to the first actuator.

Implementations according to this aspect can include one or more of the following features. For example, the second actuator can be configured to rotate the arm about a point of the first actuator while the arm rotates about the center of the inlet. In some examples, the second actuator can be configured to rotate together with the first actuator and to rotate the arm about a point of the first actuator based on rotating in a same direction together with the first actuator. In some examples, the second actuator can be configured to rotate relative to the first actuator while rotating the arm relative to the first actuator.

In some implementations, the arm can include a hinge rotatably coupled to the first actuator, a first arm that extends from the hinge and is coupled to the nozzle, and a second arm that extends from the hinge away from the first arm, where the second arm is configured to pivot about the hinge by the second actuator. In some examples, the first actuator can include a first ring gear disposed vertically above the edge of the inlet of the extractor, the first ring gear being configured to rotate about the center of the inlet. The first ring gear can include a shaft disposed at an inner circumferential portion of the first ring gear and rotatably coupled to the arm, and a first external gear disposed at an outer circumferential portion of the first ring gear and coupled to a first power source.

In some examples, the second actuator can include a second ring gear disposed vertically above the first ring gear and configured to rotate about the center of the inlet. The second ring gear can include an internal gear disposed at an inner circumferential portion of the second ring gear and engaged with the second arm, the internal gear being configured to pivot the second arm about the hinge, and a second outer gear disposed at an outer circumferential portion of the second ring gear and coupled to a second power source. In some examples, the second ring gear can be configured to rotate together with the first ring gear in a same direction.

In some examples, the first ring gear is configured to rotate about the center of the inlet at a first revolution speed, and the second ring gear can be configured to rotate about the center of the inlet relative to the first ring gear at a second revolution speed different from the first revolution speed, where the second ring gear is configured to rotate the arm about the hinge based on the relative rotation of the second ring gear with respect to the first ring gear. In some examples, the first ring gear and the second ring gear can be configured to rotate together in a first direction about the center of the inlet, where the second ring gear is configured to, based on the second revolution speed being greater than the first revolution speed, rotate the arm about the hinge in the first direction. In some examples, the second ring gear can be configured to, based on the second revolution speed being less than the first revolution speed, rotate the arm about the hinge in a second direction opposite to the first direction.

In some implementations, the first ring gear can be configured to rotate about the center of the inlet at a first revolution speed in a first direction about the center of the inlet, and the second ring gear can be configured to rotate about the center of the inlet at a second revolution speed in the first direction. The second ring gear can be configured to, based on the second revolution speed being different from the first revolution speed, rotate the arm about the hinge, and, based on the second revolution speed being equal to the first revolution speed, not rotate the arm about the hinge.

In some implementations, the dispenser can include a tray configured to rotatably support the first actuator and the second actuator vertically above the inlet of the extractor. In some implementations, the coffee maker can include a body that accommodates the extractor and the dispenser, where the tray is coupled to the body.

In some implementations, the dispenser can include a restriction mechanism configured to limit rotation of the second ring gear relative to the first ring gear. For example, the restriction mechanism can include a pair of first stoppers disposed at the second ring gear and spaced apart from each other, and a second stopper disposed at the first ring gear and arranged between the pair of first stoppers.

In some implementations, the second actuator can include a clutch configured to cut off power supplied to the second ring gear based on rotation of the second ring gear being restricted. For example, the clutch can include a sleeve that is engaged with the second ring gear and that defines a plurality of recesses at an inner circumferential surface of the sleeve, and a rotor that is rotatably disposed within the sleeve and connected to a power source, where the rotor includes a plurality of ribs that are configured to be inserted into the plurality of recesses. In some examples, the plurality of ribs are made of an elastic material and configured to deform based on rotation of the second ring gear being restricted to thereby disengage with the plurality of recesses.

In some implementations, the second actuator can be configured to rotate the arm to a position adjacent to the edge of the inlet of the extractor based on the ground coffee being supplied to the extractor.

In some implementations, the nozzle can supply water and move with a high degree of freedom. For movement with a high degree of freedom, various mechanical mechanisms can be applied to the dispenser as described in the present disclosure. For instance, the mechanical mechanisms can perform rotation and revolution of the nozzle above an inlet of an extractor. In addition, the mechanical mechanisms of the dispenser simultaneously or individually control such rotation and revolution of the nozzle. Accordingly, the dispenser can implement motion of the nozzle optimized for coffee extraction by uniformly supplying water to coffee grounds. The dispenser can freely modify motion and trajectory of the nozzle when necessary by the mechanisms of providing a high degree of freedom and thus various recipes for coffee extraction can be implemented. Furthermore, the dispenser can also implement motion of the nozzle that avoids supplied coffee grounds based on a high degree of freedom provided by the mechanical mechanisms.

An additional range of applicability of examples described in the present disclosure will be apparent from the detailed description given below. However, it will be appreciated by those skilled in the art that various changes and modifications can be made in the scope and spirit, and it should be also appreciated that configurations of the detailed description are given merely as an example.

BRIEF DESCRIPTION OF THE DRAWINGS

The present disclosure will become more fully understood from the detailed description given herein below and the accompanying drawings, which are given by illustration only, and thus are not limitative.

DETAILED DESCRIPTION

Hereinafter, one or more examples of a coffee maker will be described in detail with reference to the accompanying drawings.

In some cases, the term "whole beans" may refer to raw coffee beans harvested from coffee trees. In some examples, the whole beans may refer to roasted coffee beans. The roasted coffee beans can have various types according to a roasted degree. For example, dark roasted coffee that is roasted for a long time can dissolve coffee ingredients in water more easily than light roasted coffee. In this application, the whole beans may refer to the roasted coffee beans to be used for coffee extraction regardless of the roasted degree.

In some examples, the size of ground coffee, i.e., the size of coffee grounds, can be differently set according to whole bean types. Therefore, coffee grounds having a preset size refers to coffee grounds having a size varying with preferences and whole bean types, rather than coffee grounds having a specific size.

A coffee maker in the present disclosure refers to a device for mixing ground coffee, i.e., coffee grounds, with water, dissolving coffee ingredients in water, and then extracting liquid coffee or coffee liquid. The coffee liquid refers to water containing coffee ingredients extracted from coffee grounds. In some implementations, extracting coffee liquid means that water containing coffee ingredients extracted from coffee grounds is prepared.

Coffee may generally refer to coffee liquid. Coffee beans and coffee grounds (ground coffee) may refer to coffee of a solid type. Ground coffee refers to coffee beans that have been ground down or otherwise processed to be put into a machine to make coffee.

The present disclosure describes examples of a coffee maker having a dispenser disposed above a container or extractor for receiving ground coffee and water. The principles and configurations of the described examples can be applied to any type of coffee maker that extracts coffee by supplying water to ground coffee.

The overall configuration of an example of a coffee maker will be described below with reference to the related drawings. In this regard, FIG. 1 is a schematic view showing an example of a coffee maker.

Figure 1:
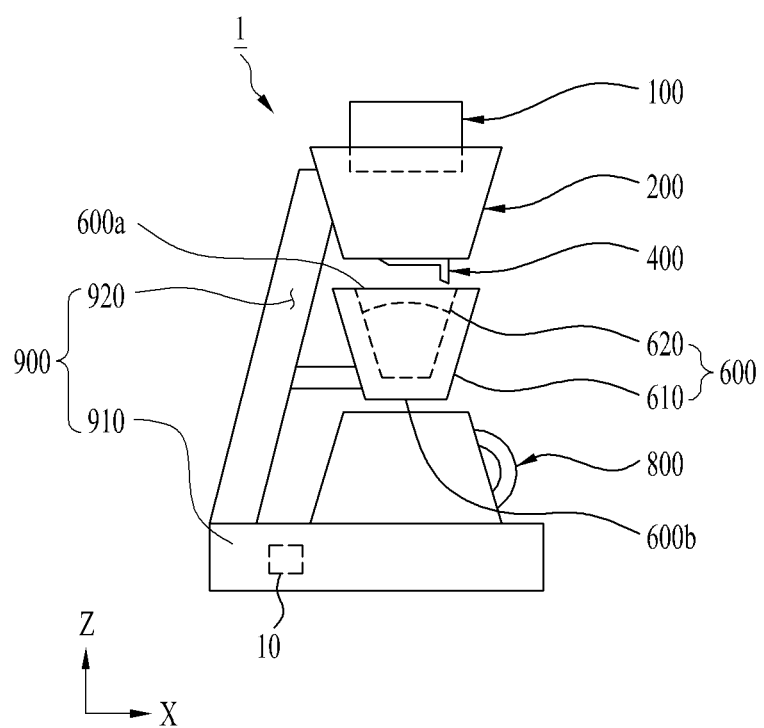
FIG. 1 is a schematic view showing an example of a coffee maker.

Referring to FIG. 1, a coffee maker 1 can include an extractor 600 that receives supplied hot water and ground coffee and extracts coffee, i.e., liquid coffee, by bringing the ground coffee into contact with water. The extractor 600 can include a container 610 and a filter 620 accommodated in the container 610. In practice, the filter 620 primarily receives supplied ground coffee, i.e., coffee grounds, and water, and is configured to pass only extracted liquid coffee. The container 610 serves to stably support the filter 620. The extractor 600 can include a relatively large inlet 600a for smoothly receiving coffee grounds and water and a relatively small outlet 600b which is advantageous for inducing extracted coffee liquid. That is, the extractor 600 can generally have a funnel shape.

In some implementations, the extractor 600 can extract coffee using both a cold brew method and a hot brew method based on the temperature of water used for extraction. If water of a first temperature, which is less than room temperature, is used, this can be regarded as the cold brew method and, if water of a second temperature higher than the first temperature is used, this can be regarded as the hot brew method. The extractor 600 can include a first extraction unit configured to use water of the first temperature or a second extraction unit configured to use water of the second temperature, i.e., hot water. Both the first and second extraction units can be installed in the coffee maker 1. In some examples, a user can mount a corresponding extraction unit on the coffee maker 1 according to a desired extraction method.

The coffee maker 1 can include a water supply unit, i.e., a dispenser 400, configured to supply water to the extractor 600. The dispenser 400 can be disposed above the extractor 600, more precisely, the inlet 600a of the extractor 600, in order to naturally supply water to the extractor 600 by gravity. The dispenser 400 can include a heater that heats water or can receive hot water, i.e., water of the second temperature, from an external water supply source. The dispenser 400 can supply hot water to coffee grounds in the extractor 600 using a nozzle. Alternatively, the dispenser 400 can directly supply water of room temperature, i.e., water of the first temperature, to the extractor 600 without any heating.

The coffee maker 1 can include a grinder 200 that grinds whole beans to make ground coffee of a predetermined size or less, i.e., coffee grounds. Since a grinding degree can be different and an extracted degree can also be different according to coffee types, the grinding degree can be differently set in the grinder 200 according to user selection or coffee types. The grinder 200 can also be disposed above the extractor 600 to naturally supply ground coffee to the extractor 600 by gravity.

In some examples, the grinder 200 has a relatively large size. When the dispenser 400 is disposed above the grinder 200, supply of water may be hindered by the grinder 200. Accordingly, the grinder 200 is disposed above the dispenser 400 and thus the dispenser 400 can be disposed between the grinder 200 and the extractor 600. By this arrangement, the grinder 200 first supplies ground coffee or coffee grounds to the extractor 600 through the inlet 600a of the extractor 600 opened toward the grinder 200 and then the dispenser 400 can supply water to the previously supplied coffee grounds in the extractor 600 for coffee extraction.

In addition, the coffee maker 1 can include a whole bean supplier 100 for supplying whole coffee beans to the grinder 200. The whole bean supplier 100 can be configured to store a sufficient amount of whole beans and supply a predetermined amount of whole beans to the grinder 200 whenever necessary. Alternatively, whole beans can be provided as a disposable whole bean storage capsule that stores only whole beans to be consumed once. If the whole bean storage capsule is disposed in the whole bean supplier 100, the whole bean storage capsule is automatically opened so that whole beans therein can be discharged to the grinder 200.

In some cases, an identification device containing information about the type of whole beans etc. can be attached to the whole bean storage capsule. The identification device can contain information about the type of whole beans, a roasting degree, and a roasting date. After recognizing the information related to whole beans, the grinder 200 can adjust the grinding degree and the extractor 600 can adjust an extraction time.

The coffee maker 1 can include a server 800 disposed below the extractor 600. The server 800 can be configured to receive and store coffee liquid discharged through the extractor 600, more precisely, the outlet 600b of the extractor 600. When necessary, the server 800 can be detachably installed in the coffee maker 1 so that the stored coffee can be moved to another place.

The coffee maker 1 can include a body 900 configured to accommodate and support the above-described internal devices 100, 200, 400, 600, and 800. As shown, the body 900 can include a base 910 that rests on the floor and a supporter 920 that is extended upward from the base 910. For example, as shown in FIG. 1, the supplier 100, the grinder 200, the dispenser 400, and the extractor 600 can be mounted directly to the supporter 920 or using other accessories and can be supported by the supporter 920. As mentioned above, the server 800 can be detachably disposed on the base 910 and can be separated from the coffee maker 1 in order to move the stored coffee to another container.

The coffee maker 1 can include a control device 10. The control device 10 can be disposed, for example, in the base 910. The control device 10 can be configured to control all operations of the coffee maker 1 and the devices 100, 200, 400, 600, and 800 of the coffee maker 1. In some implementations, the control device 10 can include a substrate, and a processor and related electronic components and circuits mounted on the substrate and can be electrically connected to the devices 100, 200, 400, 600, 800 of the coffee maker 1. Therefore, the control device 10 can substantially control these elements for an intended operation.

The control device 10, i.e., the processor, can include various devices such as a controller and a controlling unit that can control all or some elements of the dispenser 400 in order to perform operation of the dispenser 400 to be described later. In some examples, the control device 10 substantially controls all operations described below and motions performed by the operations in the present disclosure. In some examples, all features related to the control operations described below can be features of the control device 10. Although not described as being performed by the control device 10, detailed features of operations and motions described herein can be understood as features of the control device 10. Alternatively, operations of individual elements performed by the control device 10 can also be regarded as unique features of the corresponding elements.

The dispenser 400, more precisely, the nozzle of the dispenser 400 can supply water and can be fixed so as not to move, in some cases. In some examples, the nozzle of the dispenser 400 can be configured to supply water to a specific point of coffee grounds in the extractor 600. In addition, even if the nozzle of the dispenser 400 is configured to be movable, movement of the nozzle is limited in most cases. For this reason, in order to uniformly supply water to coffee grounds in the extractor 600, the coffee maker 1 can include the dispenser 400 configured to freely move the nozzle to desired points. A detailed description of this dispenser 400 will be given in detail below with reference to the related drawings.

Figure 2:
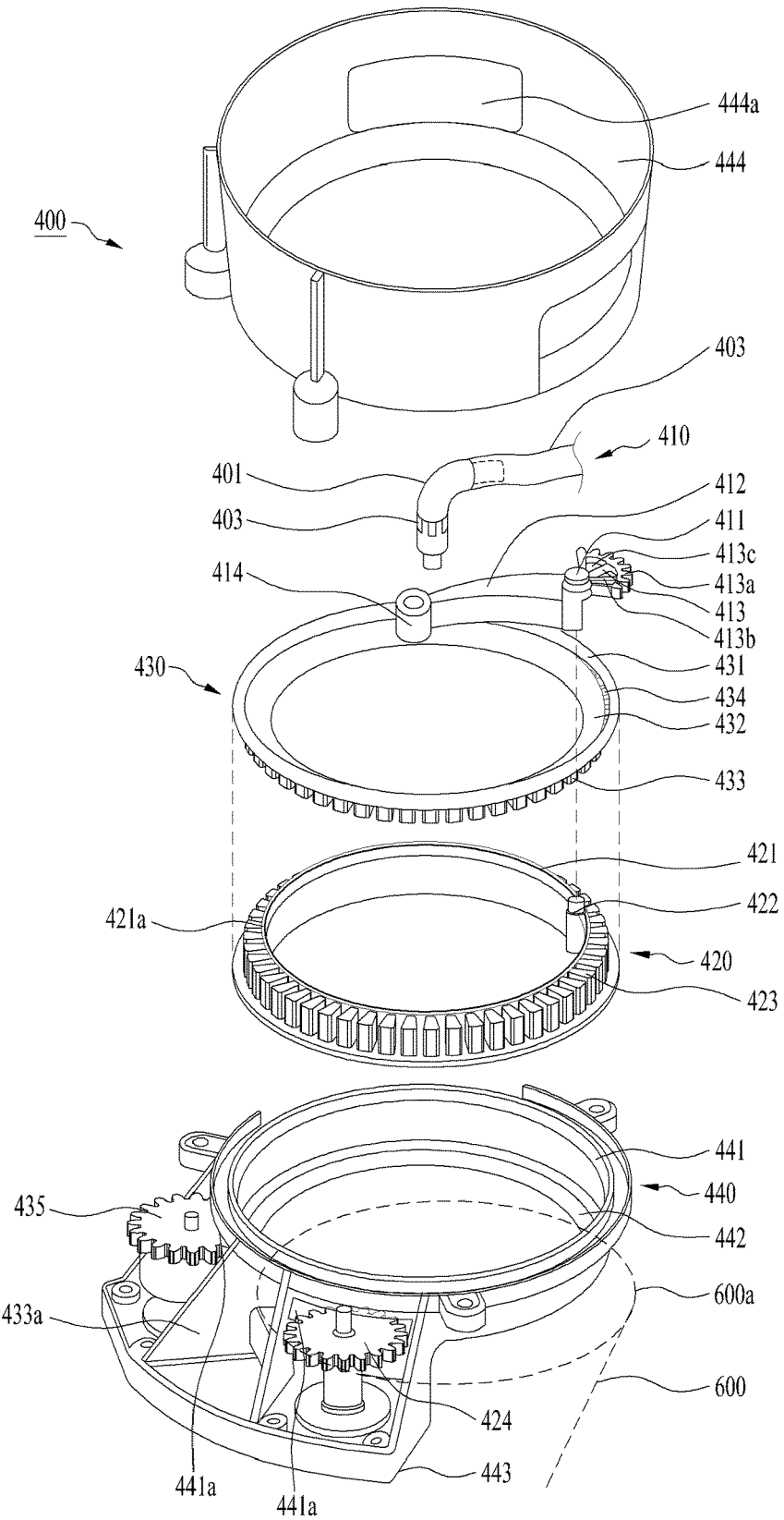
FIG. 2 is an exploded perspective view showing an example of a dispenser of a coffee maker.
Figure 3:
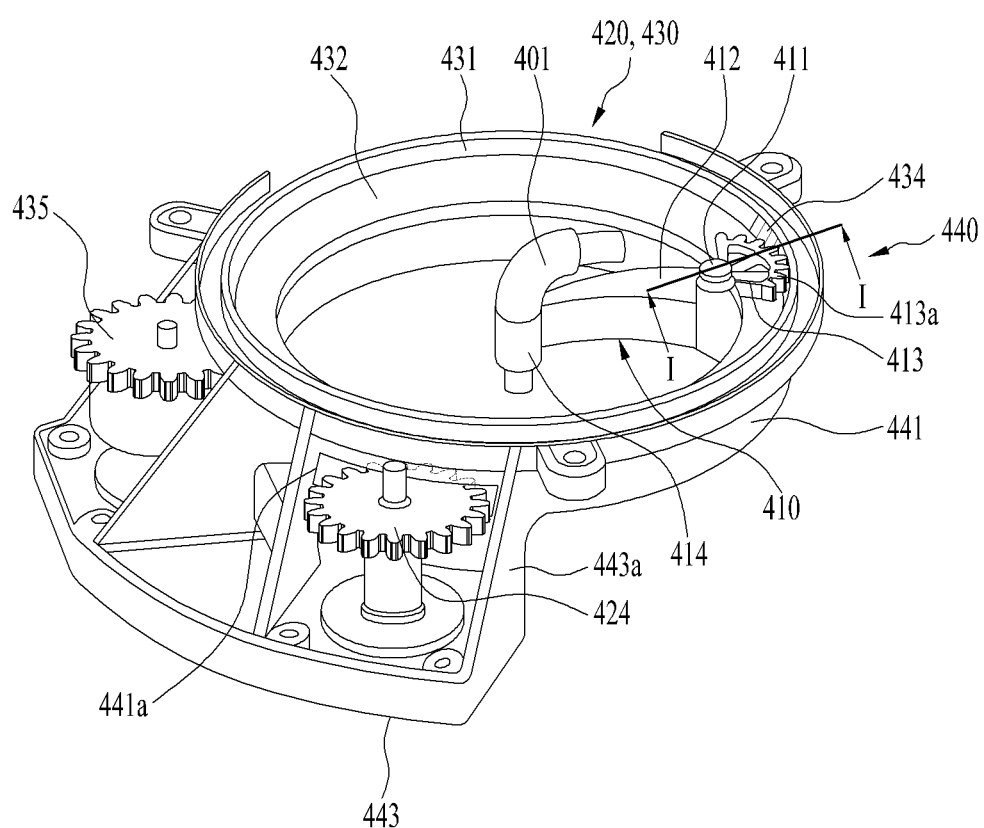
FIG. 3 is a perspective view showing examples of an assembled arm, a first actuator, a second actuator, and a tray of the dispenser of FIG. 2.
Figure 4:
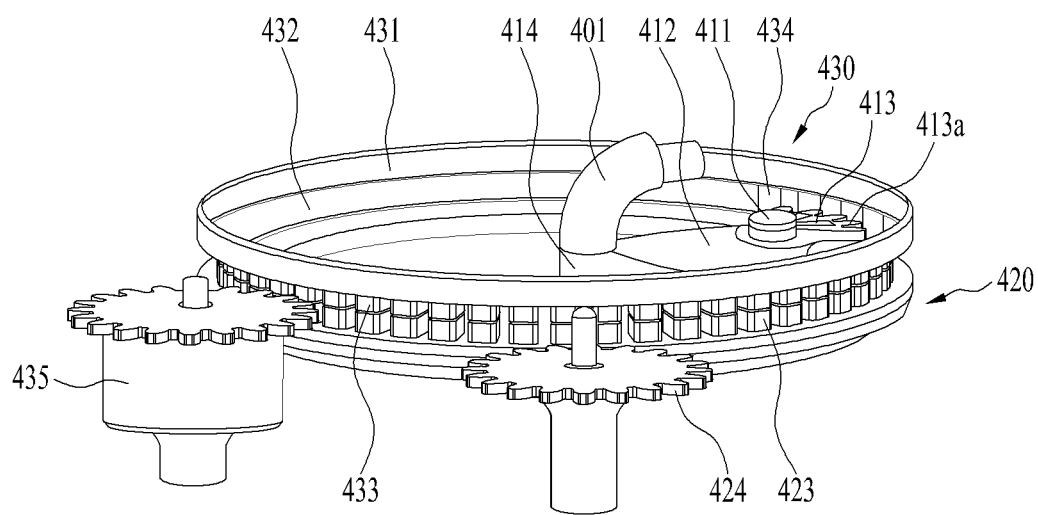
FIG. 4 is a perspective view showing the assembled arm, and the first and second actuators of the dispenser of FIG. 2.
Figure 5:
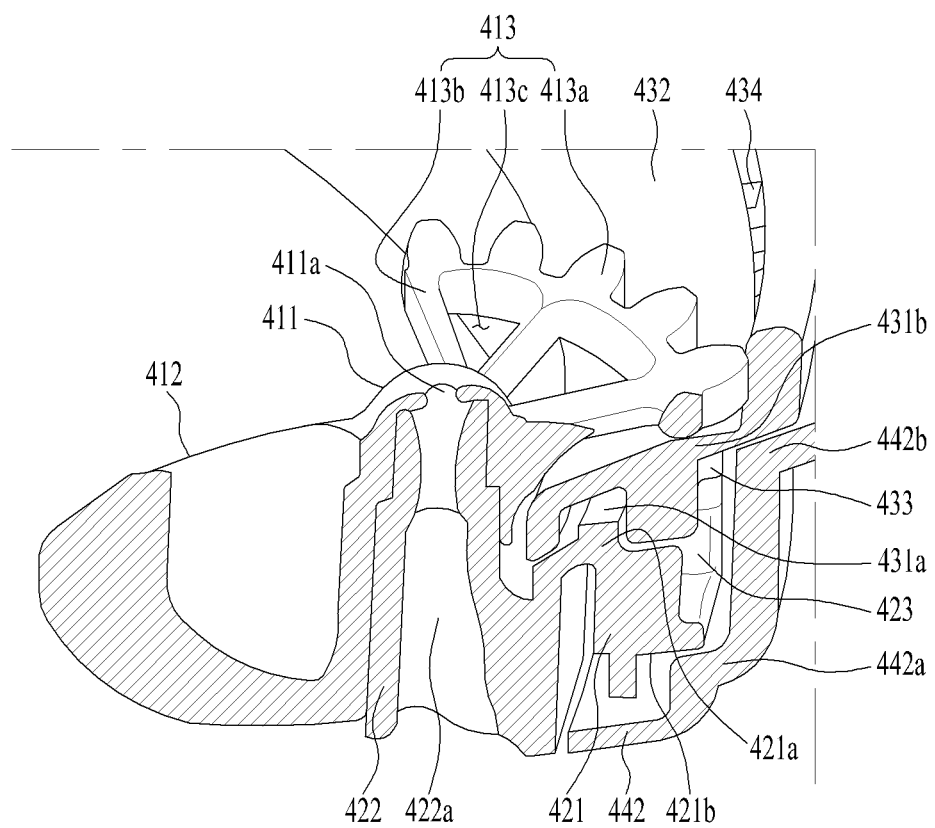
FIG. 5 is a cross-sectional view taken along line I-I of FIG. 3.
Figure 6:
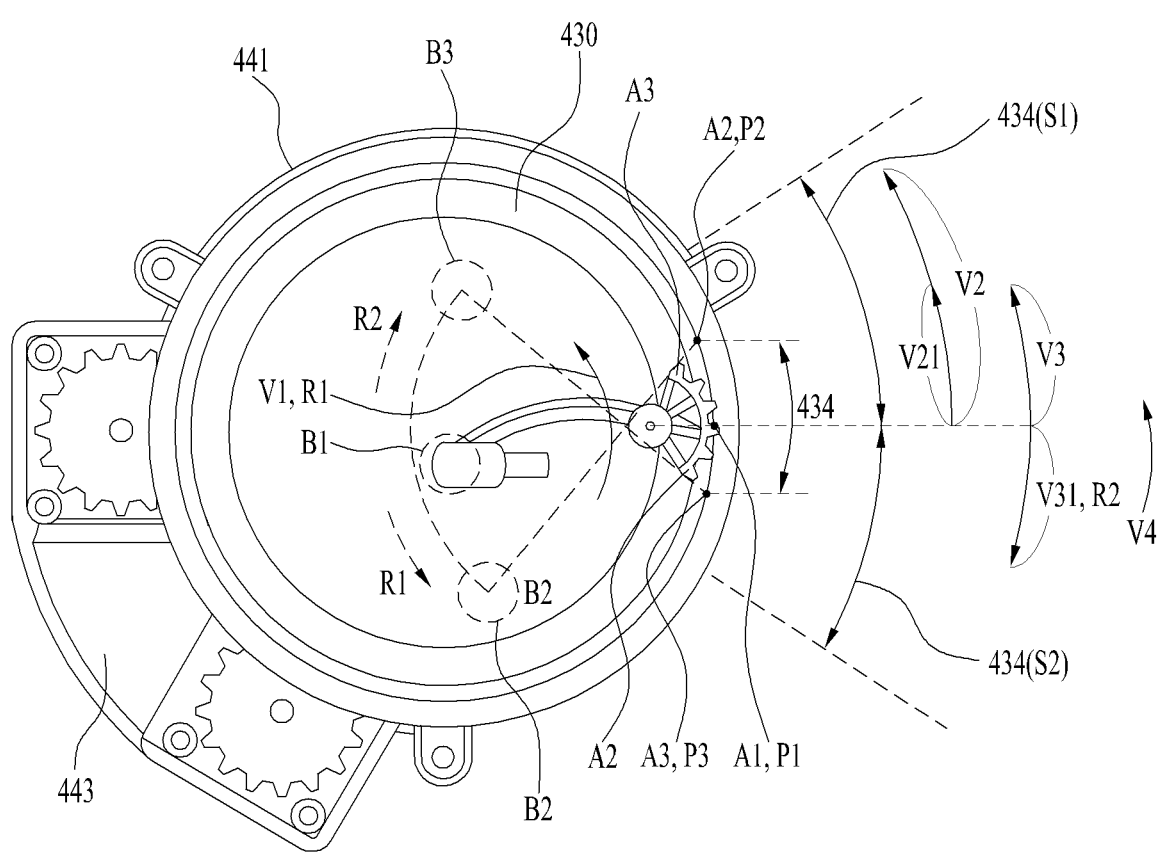
FIG. 6 is a plan view showing an example of motion of the arm based on relative motion of the first and second actuators.
Figure 7:
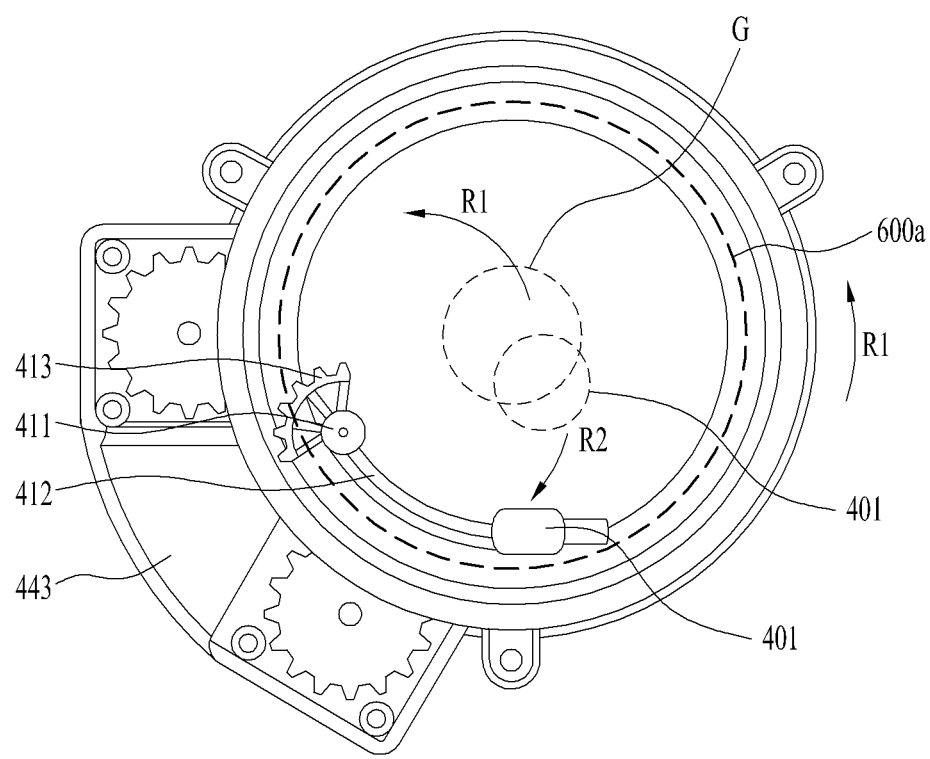
FIG. 7 is a plan view showing an example of motion of the arm and a nozzle to facilitate supply of ground coffee.

FIG. 2 is an exploded perspective view showing an example of a dispenser of a coffee maker. FIG. 3 is a perspective view showing examples of an assembled arm, a first actuator, a second actuator, and a tray of the dispenser of FIG. 2. FIG. 4 is a perspective view showing the assembled arm, and the first and second actuators of the dispenser of FIG. 2. FIG. 5 is a cross-sectional view taken along line I-I of FIG. 3. FIG. 6 is a plan view showing an example of motion of the arm based on a relative motion of the first and second actuators. FIG. 7 is a plan view showing motion of the arm and a nozzle avoiding supplied ground coffee.

In some implementations, referring to FIGS. 2 to 5, the dispenser 400 can include an arm 410 that is movably or rotatably disposed above the inlet 600a of the extractor 600. The arm 410 includes a nozzle 401 for supplying water, and a tube 402 connected to a water supply source is connected to the nozzle 401. As shown, the nozzle 401 is oriented downward and, thereby, water supplied through the tube 402 is sprayed from the nozzle 401 onto ground coffee, i.e., coffee grounds, in the extractor 600 by gravity. As will be described in detail later, the arm 410 can hold the nozzle 401 so as not to be separated from the nozzle 401 and can rotatably support the nozzle 401.

In some implementations, the arm 410 can include a hinge 411 configured to function as a center of rotation of the arm 410. The hinge 411 can generally be oriented vertically and can be positioned to be separated from ends of a body of the arm 410. Accordingly, the arm 410 can be configured to rotate about the hinge 411 in a plane parallel to the inlet 600a above the inlet 600a of the extractor 600. As described later, the hinge 411 is rotatably coupled to another device of the adjacent dispenser 400, e.g., a first actuator 420, and the arm 410 can rotate about the hinge 411.

The arm 410 can also include a first arm 412 extended by a predetermined length from the hinge 411. The first arm 412 can be generally disposed above the inlet 600a of the extractor 600, and the nozzle 401 coupled to the first arm 412 can also be disposed above the inlet 600a so as to supply water to coffee grounds in the extractor 600. In some implementations, the first arm 412 can include a sleeve 414 arranged at the other end opposite to an end connected to the hinge 411. The nozzle 401 can be vertically oriented and can be rotatably inserted into the sleeve 414, as shown in FIG. 2. As will be described later, the nozzle 401 can perform various motions, such as rotation and revolution, together with the arm 410. The nozzle 401 is rotatably coupled to the sleeve 414 so as to perform various motions without being separated from the tube 402. The nozzle 401 can include protrusions 403 disposed along an outer circumferential portion of the nozzle 401. The protrusions 403 can latch on an end of the sleeve 414 and restrict the nozzle 401 from being separated while rotating relative to the sleeve 414.

The arm 410 can also include a second arm 413 extended from the hinge 411 to be opposite to the first arm 412. As will be described later, the second arm 413 extends toward a second actuator 430 and can be relatively movably coupled to the second actuator 430. In practice, the second arm 413 can be coupled to the second actuator 430 and can be configured to be pivotable around the hinge 411 by the second actuator 430. In some implementations, the second arm 413 can include a pinion 413a of a predetermined length formed at the other end opposite to an end connected to the hinge 411 of the second arm 413. The second arm 413 can also include a plurality of ribs or spokes 413b connecting the pinion 413a and the hinge 411 and include an opening 413c formed between the ribs 413b. Supplied coffee grounds may not be accumulated on the arm 410, more precisely, the second arm 413, and can drop into the extractor 600 through the opening 413c. For the same reason, as is well shown in FIG. 5, the first arm 412 can include a thin-thickness and inclined side faces and the supplied coffee grounds may not be accumulated on the first arm 412 and can be guided to the extractor 600. Therefore, rotation of the arm 410 may not be disturbed by accumulated coffee grounds by the various mechanisms described above.

In addition to the arm 410, the dispenser 400 can include the first actuator 420 disposed above the inlet 600a of the extractor 600 and configured to rotatably support the arm 410. The first actuator 420 can be configured to cause the arm 410 together with the nozzle 401 coupled to the arm 410 to revolve around a center C of the inlet 600a.

For such revolution, the first actuator 420 can include a first ring gear 421 disposed or located above the inlet 600a, in some implementations, above the edge of the inlet 600a. The first ring gear 421 can be also disposed or located at or on the edge of the inlet 600a. Further, the first ring gear 421 can be disposed or extend along such an edge of the inlet 600a. The first ring gear 421 has a body that is continuously extended in a circumferential direction along the entire edge of the inlet 600a, thereby surrounding the inlet 600a. In some implementations, the first ring gear 421 can include a shaft 422 disposed on an inner circumferential portion of the first ring gear 421 and rotatably coupled to the arm 410. The shaft 422 can be vertically oriented as shown and can be inserted into the hinge 411 of the arm 410. Accordingly, the arm 410 can stably rotate around the shaft 422 and the hinge 411. The first ring gear 421 can include a first external gear 423 disposed on an outer circumferential portion of the first ring gear 421. The first external gear 423 is substantially formed of teeth arranged along the outer circumferential portion of the first ring gear 421 and can be formed over the entire outer circumferential. The first ring gear 421 can include a first driving gear 424 engaged with the first external gear 423. The first driving gear 424 can be coupled to a predetermined power source, e.g., a motor, and can rotate by the power source. Accordingly, the first ring gear 421, i.e., the first actuator 420, moves along a predetermined trajectory formed along the edge of the inlet 600a around the center C of the inlet 600a. The arm 410 and the nozzle 401, coupled to the first actuator 420, can also move along the trajectory. That is, while revolving around the center C of the inlet 600a, the first ring gear 421 and the first actuator 420 including such a first ring gear 421 can cause the arm 410 and the nozzle 401 coupled to the first ring gear 421 to revolve in the same manner, and, at the same time, can support the arm 410 and the nozzle 401 to rotate with regard to one point or position (i.e., the shaft 422) on the first ring gear 421 of the first actuator 420.

Like the first actuator 420, the dispenser 400 can include the second actuator 430 disposed above the inlet 600a of the extractor 600. The second actuator 430 can be configured to rotate the arm 410 that is rotatably supported by the first actuator 420, together with the nozzle 401, around a support point (i.e., one point of the first actuator 420). The second actuator 430 can be connected or coupled to the arm 410 so as to transfer power required for such rotation. The arm 410 is coupled to the first actuator 420 as mentioned above and, at the same time, is coupled to the second actuator 430 for rotation. Therefore, for smooth operation of the arm 410, the second actuator 430 can also be basically configured to perform the same motion as the first actuator 420, i.e., revolution.

In some implementations, the second actuator 430 can include a second ring gear 431 disposed on the first ring gear 421, i.e., stacked on the first ring gear 421. That is, the second ring gear 431 can be disposed or extend along the first ring gear 421. By this arrangement, the second ring gear 431 can be disposed or located above the inlet 600a, more precisely, above the edge of the inlet 600a, like the first ring gear 421. The second ring gear 431 can be also disposed or located at or on the edge of the inlet 600a. Further, the second ring gear 431 can be disposed or extend along such an edge of the inlet 600a. Like the first ring gear 421, the second ring gear 431 can also have a body that is continuously extended in a circumferential direction along the entire edge of the inlet 600a, thereby surrounding the inlet 600a. The second ring gear 431 can include a second external gear 433 disposed on an outer circumferential portion of the second ring gear 431. The second external gear 433 is substantially formed of teeth arranged along the outer circumferential portion of the second ring gear 431 and can be formed over the entire outer circumferential portion. The second ring gear 431 can include a second drive gear 435 engaged with the second external gear 433. The second drive gear 435 can be coupled to a predetermined power source, e.g., a motor, and can rotate by the power source. Accordingly, the second drive gear 435 can be engaged with the second external gear 433 to rotate the second ring gear 431. As mentioned above, since the second ring gear 431 is disposed above the first ring gear 421, the bottom of the second ring gear 431 can contact the top of the first ring gear 421 so that the second ring gear 431 moves along the top. That is, the top of the first ring gear 421 functions as a bearing with respect to the second ring gear 431. For smoother movement, as is well shown in FIG. 5, the first ring gear 421 can include a protrusion 421a protruding from the top of the first ring gear 421 toward the second ring gear 431, and the second ring gear 431 can include a recess 431a that is formed at the bottom of the second ring gear 431 and receives the protrusion 421a. The protrusion 421a and the recess 431a can be extended over the entire top and bottom of the first and second ring gears 421 and 431 in a circumferential direction. The second ring gear 431 can stably move without being separated from the first ring gear 421 by the protrusion 421a and the recess 431a. Accordingly, the second ring gear 431, i.e., the second actuator 430, can revolve around the center C of the inlet 600a and can harmonize with motion of the first actuator 420 so as to secure smooth operation of the arm 410 coupled to both the first and second actuators 420 and 430.

The second ring gear 431 can include an internal gear 434 disposed on an inner circumferential portion of the second ring gear 431. The internal gear 434 is composed of teeth arranged along the inner circumferential portion of the second ring gear 431 and can be formed over the inner circumferential portion. The arm 410, for example, the second arm 413 thereof, can be engaged with the internal gear 434 using the pinion 413a disposed at an end of the second arm 413. Therefore, when the second ring gear 431 moves, i.e., revolves, the internal gear 434 can also move in the same direction and pivot the second arm 413 (i.e., the pinion 413a) engaged with the internal gear 434 around the hinge 411. Since the first arm 412 and the nozzle 401 are also connected to the hinge 411, the first arm 412 and the nozzle 401 can also pivot around the hinge 411 by pivoting of the second arm 413. Accordingly, the second actuator 430 can substantially rotate the arm 410 and the nozzle 401 about the hinge 411 by revolution of the second ring gear 431 and the internal gear 434. Generally, since the internal gear 434 rotates the pinion 413a engaged therewith in the same direction, the first and second arms 412 and 413, i.e., the arm 410 and the nozzle 401, can also rotate in the same direction as a revolution direction of the second ring gear 431. In addition, since the arm 410 is rotatably coupled to the shaft 422 of the first actuator 420 and this shaft 422 also revolves along the edge of the inlet 600a, the arm 410 can rotate about the edge of the inlet 600a or one point of a revolution trajectory as well as one point of the first actuator 420, i.e., the first ring gear 421. Since the second arm 413 can pivot as much as the length of the internal gear 434, the rotation range or angle of the arm 410 according to pivoting of the second arm 413 can be determined by the length of the internal gear 434 engaged with the second arm 413. For example, the length of the internal gear 434 can be set such that the arm 410 has a rotation angle that does not interfere with surrounding components, e.g., the second ring gear 431.

The second ring gear 431 can include a supporter 432 extended from an inner circumferential portion of a body of the second ring gear 431 to an inner side of a radial direction. The supporter 432 can generally be formed of a plate-shaped member and can be formed over the entire inner circumferential portion of the second ring gear 431. The supporter 432 can stably support the second arm 413 that pivots by the internal gear 434. If the arm 410 rotates and is disposed along or aligned with the edge of the inlet 600a while being located above or on such an edge, the supporter 432 can uniformly support the entire arm 410.

As described above, since the arm 410 is coupled to both the first and second ring gears 421 and 431, the second ring gear 431, i.e., the second actuator 430, needs to move, i.e., revolve, relative to the first ring gear 421, i.e., the first actuator 420, in order to apply motion for rotation to the arm 410. For such relative revolution, basically, motion characteristics, i.e., the amount of revolution and/or a revolution direction, of the second ring gear 421 relative to the first ring gear 421 can be adjusted. Furthermore, since the first ring gear 421 is configured to be movable, motion or operation of the second ring gear 421 can be differently adjusted according to revolution and stop of the first ring gear 421. Motion of the second ring gear 431, i.e., the second actuator 430, for rotating the arm 410, will be described in more detail later with reference to FIG. 6. In FIG. 6, revolution speeds and directions of the first and second ring gears 421 and 431 are indicated by arrows. Since these arrows are exaggerated or reduced to aid in understanding, the arrows do not always coincide with actual speeds and direction.

In some examples, when the first ring gear 421 revolves at a predetermined speed and direction, the second ring gear 431 can revolve faster or much more in the same direction as a revolution direction of the first ring gear 421 in order to generate relative motion. Alternatively, the second ring gear 431 can simply revolve in an opposite direction to the revolution direction of the first ring gear 421. However, when the second ring gear 431 revolves in the opposite direction to the revolution direction of first ring gear 421, it can be difficult to control rotation of the arm 410 caused by relative motion because large relative motion rapidly occurs. Accordingly, when the first ring gear 421 revolves, the second ring gear 431 can be configured to revolve together with the first ring gear 421, i.e., at the same time, in the same direction. In addition, the first and second ring gears 421 and 431 can be configured to revolve at different revolution speeds. Accordingly, different amounts of revolution are generated by the first and second ring gears 421 and 431 and thus the second ring gear 431 can revolve in the same direction as or in an opposite direction to a revolution direction of the first ring gear 421 relative to the first ring gear 421 while revolving together with the first ring gear 421. In addition, the second ring gear 431 can rotate the arm 410 engaged therewith around the hinge in the same direction as or in an opposite direction to a rotation direction of the first ring gear 421 by a difference in the amount of revolution, i.e., the relative amount of revolution.

In some implementations, referring to FIG. 6, it can be assumed that the first ring gear 421 revolves in a first direction R1 (i.e., counterclockwise) at a first speed V1. In addition, it can be assumed that the arm 410 is substantially aligned in a radial direction of the first and second ring gears 421 and 431 so that a central portion A1 of the pinion 413a contacts a predetermined point P1 of the internal gear 434 and the nozzle 401 is disposed at a predetermined point B1 in the radial direction. In this state, if the second ring gear 431 revolves at a second speed V2, which is greater than the first speed V1 of the first ring gear 421, in the same direction as the first direction R1, which is a revolution direction of the first ring gear 421, then a relative speed V21 occurs in the first direction R1 due to a difference between the first and second speeds V1 and V2, and a difference in the amount of revolution can occur in the first direction R1 due to the relative speed V21. That is, the second ring gear 431 can further revolve in the first direction R1 by an amount of revolution relative to the first ring gear 431. The internal gear 434 is disposed in a region S1 shifted relative to the first ring gear 421 in the first direction R1 as indicated by dotted lines while revolving. While revolving, the internal gear 434 can be engaged with the pinion 413a and can pivot the second arm 413 around the hinge 411 in the first direction R1. Accordingly, while one end A2 of the pinion 413a is disposed at a predetermined point P2 of the shifted region S1 of the internal gear 434, the arm 410 can rotate in the same direction R1 as the revolution direction of the first ring gear 421 at a predetermined angle. As a result of such rotation, the nozzle 401 of the arm 410 can be located at a point B2 of the inlet 600a.

In addition, if the second ring gear 431 revolves at a third speed V3, which is less than the first speed V1 of the first ring gear 421, in the same direction as the first direction R1, which is a revolution direction of the first ring gear 421, then a relative speed V31 can occur in a second direction R2 (i.e., a clockwise direction), which is a direction opposite to the first direction R1, due to a difference between the first and third speeds V1 and V3, and a difference in the amount of revolution can occur due to the relative speed V31. That is, since the first ring gear 421 further revolves than the second ring gear 431 by a relative amount of revolution in the first direction R1, such revolution can lead to an effect of causing the second ring gear 431 to revolve as much as a relative amount of revolution in the second direction R2 which is opposite to the first direction R1. By such relative revolution of the second ring gear 431, the internal gear 434 is disposed in a region S2 shifted relative to the first ring gear 421 in the second direction R2 as indicated by dotted lines while relatively revolving. While revolving, the internal gear 434 can be engaged with the pinion 413a. and can pivot the second arm 413 around the hinge 411 in the second direction R2. Accordingly, while an end A3 of the pinion 413a is disposed at the predetermined point P3 of the shifted region S2 of the internal gear 434, the arm 410 can rotate in the direction R2 opposite to the revolution direction of the first ring gear 421 at a predetermined angle. As a result of such rotation, the nozzle 401 of the arm 410 can be located at a point B3 of the inlet 600a.

Furthermore, if the second ring gear 431 revolves in the same direction as the first direction R1, which is the revolution direction of the first ring gear 421, at a fourth speed V4, which is the same as the first speed V1 of the first ring gear 421, no difference in speed and the amount of revolution occurs and thus no relative revolution occurs. Therefore, the arm 410 may not rotate and can maintain the current orientation. For example, the arm 410 can be disposed at the points A1 and B2. Instead, the arm 410 performs only revolution around the center C of the inlet 600a by the first ring gear 421, i.e., the first actuator 420, without rotation.

By the operation of the first and second ring gears 421 and 431 described above, while the second actuator 430 simultaneously revolves in the same direction as the revolution direction of the first actuator 420, the second actuator 430 can move (i.e., revolve) in the same or opposite direction relative to the first actuator 420 by a different revolution speed and a different amount of revolution. By this relative motion and revolution, while the second actuator 430 simultaneously revolves with the first actuator 420, the second actuator 430 can rotate the arm 410 and the nozzle 401 around one point of the first actuator 420 in the same direction as or in an opposite direction to the revolution direction of the first actuator 420. Accordingly, the first and second actuators 420 and 430 can be configured such that the arm 410 revolves and, at the same time, rotates around one point of the first actuator 420. The nozzle 401 can uniformly move over the entire region of the inlet 6001 by simultaneous revolution and rotation of the arm 410, thereby uniformly supplying water to coffee grounds in the extractor 600. The nozzle 401 can freely form various trajectories by appropriately adjusting revolution and rotation of the arm 410 and thus various recipes for coffee extraction can be implemented.

Alternatively, when the first ring gear 421 is stopped, rotation relative to the first ring gear 421 can be simply achieved only by revolution of the second ring gear 431. Therefore, while the first ring gear 421 is stopped, the second ring gear can revolve in the first direction R1 or the second direction R2 and the arm 410 can rotate in the first direction R1 or the second direction R2 in the same manner as described earlier by such a revolution of the second ring gear 431. By operation of the first and second ring gears 421 and 431, the second actuator 430 can rotate the arm 410 and the nozzle 401 around one point of the first actuator 420 in different directions R1 and R2 while revolving in different directions R1 and R2 relative to the first actuator 420. Accordingly, after revolution at a predetermined angle and stopping by the first actuator 420, i.e., the first ring gear 421, the second actuator 430, i.e., the second ring gear 431, can rotate the arm 410 and the nozzle 401 in different directions and this operation can be performed on the entire region of the inlet 600a. Accordingly, the nozzle 401 can uniformly move over the entire region of the inlet 600a, thereby uniformly supplying water to coffee grounds in the extractor 600. In addition, the nozzle 401 can freely form various trajectories over the entire area of the inlet 600a and thus various recipes for coffee extraction can be implemented.

As shown in FIG. 7, when coffee grounds are supplied to the extractor 600 manually by the user or automatically by the grinder 200, the coffee grounds generally pass through a central region G of a predetermined size disposed in the inlet 600a of the extractor 600. Therefore, if the nozzle 401 is disposed in the central region the coffee grounds can be accumulated in the nozzle 401 and can clog the nozzle 401. Therefore, while the coffee grounds are supplied to the extractor 600, the dispenser 400, i.e., the second actuator 430 of the dispenser 400, can move the nozzle 401 out of the region G.

In some implementations, the second actuator 430 can rotate the arm 410 and the nozzle 401 in the second direction R2 toward the edge of the inlet 600a so as to leave the region G. In addition, the second actuator 430 can dispose the arm 410 and the nozzle 401 above the edge of the inlet 600a along the edge of the inlet 600a as shown in order to more surely avoid the supplied coffee grounds. That is, the second actuator 430 can align the arm 410 and the nozzle 401 with the edge of the inlet 600a. Such alignment is advantageous for avoiding the supplied coffee grounds so as not to be accumulated on the arm 410 and the nozzle 401.

In some examples, as shown, the arm 410 can be formed to have a predetermined curvature. Since the curved arm 410 can be disposed parallel to the edge of the inlet 600a in a vertical or horizontal direction, the arm 410 can more effectively avoid the coffee grounds. In particular, if the arm 410 has the same curvature as the curvature of the edge of the inlet 600a, the arm 410 can completely avoid the supplied coffee grounds as shown in FIG. 7. Rotation of the arm 410 described above can be equally performed even in the first direction R1, which is the opposite direction. The rotation of the arm 410 can also be equally performed during rotation of the first actuator 420, i.e., the first ring gear 421, or during stopping of the first ring gear 421 in order to avoid the coffee grounds. The above-described avoidance motion can prevent or reduce accumulation of the coffee grounds on the nozzle 401 and the arm 410 and secure smooth operation of the dispenser 400.

In some examples, referring to FIG. 5, the hinge 411 can include a through hole 411a formed on the top of the hinge 411, and the shaft 422 can include a passage 422a communicating with the through hole 411a and penetrating a body of the shaft 422. Accordingly, the coffee grounds dropped onto the arm 410 can be directly dropped into the extractor 600 by passing through the arm 410 through the through hole 411a and the passage 422a. Such an avoidance structure can more effectively prevent, together with the aforementioned avoidance motion, the coffee grounds from being accumulated on the nozzle 401 and the arm 410.

For smooth operation and protection of the arm 410 and the first and second actuators 420 and 430 described above, the dispenser 400 can include, as shown in FIGS. 2 and 3, a housing 440 configured to receive the devices 410 to 430. The housing 440 can be coupled to a body of the coffee maker 1, e.g., the supporter 920 (see FIG. 1), to support the dispenser 400. Alternatively, the housing 440 can be directly coupled to the top of the extractor 600.

The housing 440 can first include a tray 441 for revolvably supporting the assembly of the first and second actuators 420 and 430. As described above, since the first and second actuators 420 and 430 revolve above the inlet 600a, the tray 441 can also be disposed above the inlet 600a to support the first and second actuators 420 and 430, more precisely, the first and second ring gears 421 and 431.

The body of the tray 441 can substantially have a ring shape so as to match the shape of the first and second ring gears 421 and 431. In some implementations, the tray 441 can include a supporter or flange 442 extended inward in a radial direction from the body. The supporter 442 can be disposed at the bottom of the tray 441 and can be formed over the entire inner circumferential surface of the tray 441. The supporter 442 can stably support the bottom of the first ring gear 421 as is well illustrated in FIG. 5.

The tray 441 can include a first step 442a formed along an inner circumferential surface of the tray 441 and the first ring gear 421 can include a recess 421b for receiving the first step 442a. In addition, the tray 441 can include a second step 442b formed along an inner circumferential surface of the tray 441 and the second ring gear 431 can include a recess 431b for receiving the second step 442b. By the steps and recesses 442a, 442b, 421b, and 431b, the tray 441 can stably support the first and second ring gears 421 and 431 and smoothly revolve.

In some examples, the tray 441 can include a shelf 443 disposed adjacent to an outer circumferential portion of the tray 441. The shelf 443 can be connected to the body of the tray 441 by a rib 443a. The shelf 443 can rotatably support the first and second drive gears 424 and 435. The driving gears 424 and 435 can be engaged with the first and second ring gears 421 and 431, respectively, through a slot 441a formed on an outer circumferential portion of the tray 441 as is well shown in FIG. 2.

In some examples, motors connected to the first and second drive gears 424 and 435 can be mounted on the shelf 443, and other accessories can also be mounted on the shelf 443. The housing 440 can also include a partition 444 coupled to the top of the tray 441, as shown in FIG. 2. The partition 444 is extended overall in a circumferential direction along the edge of the tray 441 and can protect the arm 410 and the first and second actuators 420 and 430 from external substances. The partition 444 can also include a window 444a formed in the body. The tube 402 can be connected to the nozzle 401 through the window 444a, and the arm 410 and the first and second actuators 420 and 430 can also be replaced and repaired.

Figure 8:
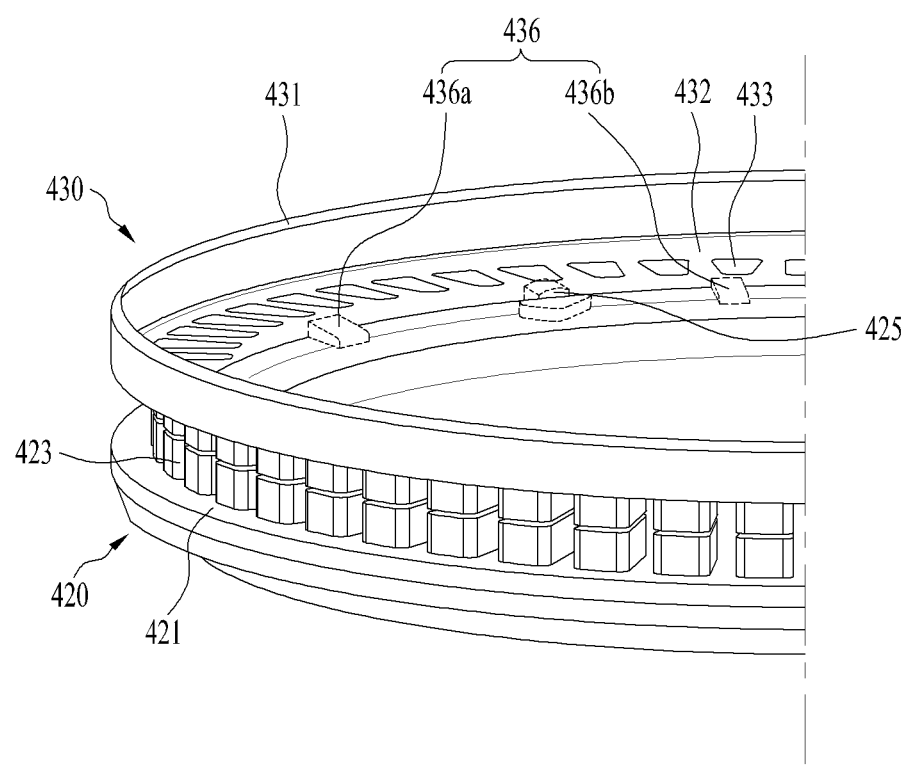
FIG. 8 is a partial perspective view showing an example of a restriction mechanism for restricting relative rotation between the first and second actuators.
Figure 9:
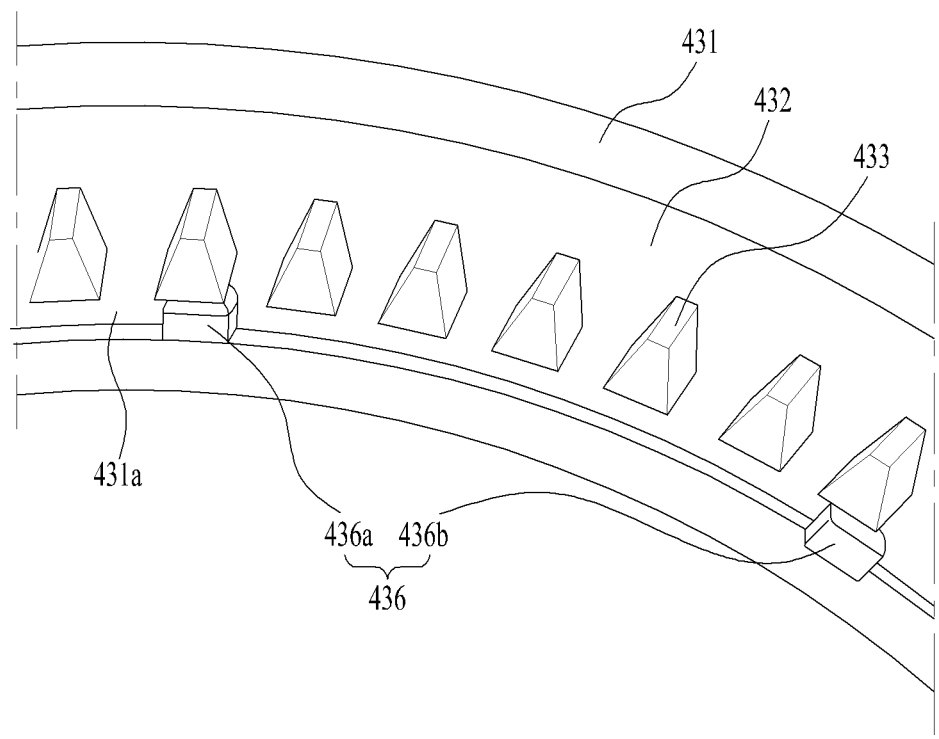
FIGS. 9 and 10 are partial perspective views showing example structures of a restriction mechanism of the first actuator and a restriction mechanism of the second actuator.
Figure 10:
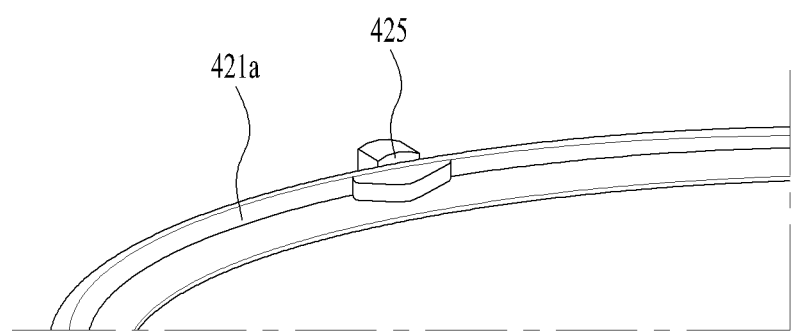

If the second ring gear 431 excessively revolves relative to the first ring gear 421, the pinion 413a of the arm 410 can be disengaged from the internal gear 434. Once disengaged, it can be difficult for the pinion 413a to be reengaged with the internal gear 434. Accordingly, when the pinion 413a is disengaged, the arm 410 may not smoothly rotate by the second ring gear 431. For this reason, the dispenser 400 can further include a restriction mechanism configured to restrict the amount of revolution of the second ring gear 431 relative to the first ring gear 421. The restriction mechanism will be described in more detail with reference to the related drawings. FIG. 8 is a partial perspective view showing a restriction mechanism for restricting relative rotation between the first and second actuators. FIGS. 9 and 10 are partial perspective views showing structures of a restriction mechanism of the first actuator and a restriction mechanism of the second actuator, A restriction mechanism can include a pair of first stoppers 436 (436a and 436b) disposed at the second ring gear 431 and separated from each other by a predetermined interval and a second stopper 425 disposed at the first ring gear 421 so as to be disposed between the pair of the stoppers 436. The first stoppers 436 can be disposed at the bottom of the second ring gear 431 engaged with the first ring gear 421 as shown in FIG. 9. In some implementations, the first stoppers 436 can be disposed in the recess 431a for receiving the protrusion 421a of the first ring gear 421.

The second stopper 425 can be disposed at the top of the first ring gear 421 engaged with the second ring gear 431, as is well shown in FIG. 10. In some implementations, the second stopper 425 can be disposed on the protrusion 421a inserted into the recess 431a of the second ring gear 431. A circumferential distance between the first stoppers 436 can be set to correspond to the length of the internal gear 434. Accordingly, during relative rotation of the first and second ring gears 421 and 431, the second stopper 425 is locked to the first stopper 436 and thus is allowed to move only between the first stoppers 436. Accordingly, the first and second stoppers 425 and 436 can limit a relative amount of revolution of the second ring gear 431 to the length of the internal gear 434 and prevent the pinion 413a of the arm 410 from being disengaged from the internal gear 434.

Figure 11:
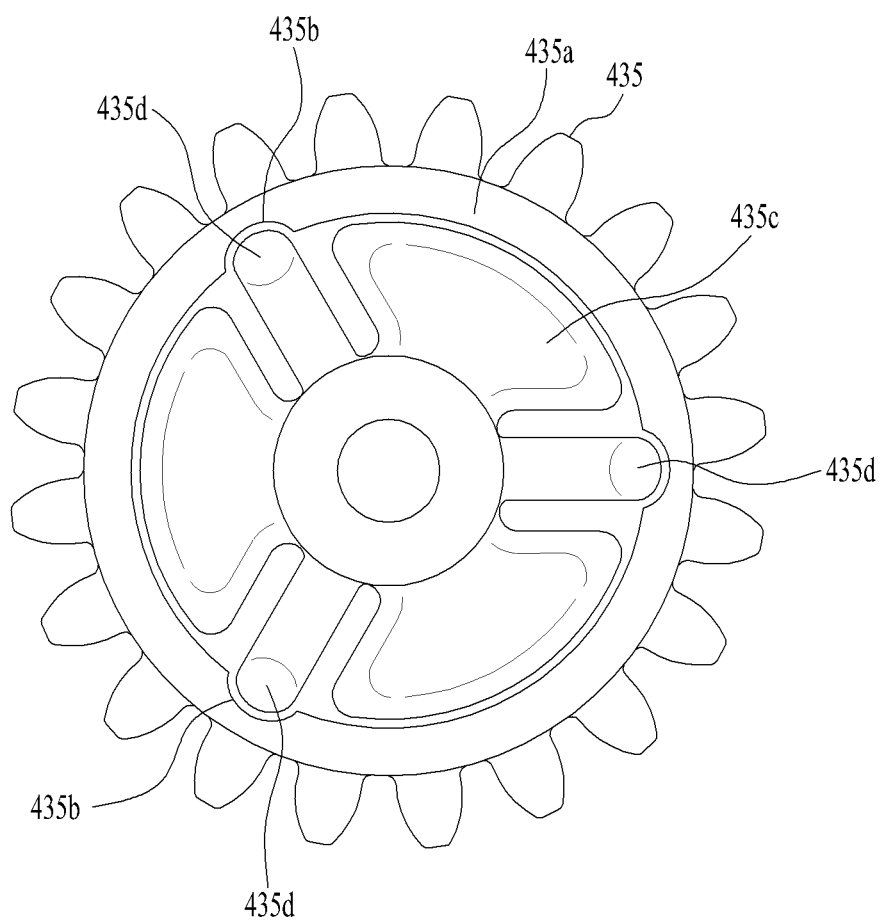
FIG. 11 is a cross-sectional view showing an example of a clutch of a second actuator.

During the operation of the dispenser 400, revolution of the second ring gear 431 can be restricted or disturbed for various reasons. For example, if foreign substances are interposed between the first and second ring gears 431, revolution of the second ring gear 431 can be disturbed. In addition, for example, revolution of the second ring gear 431 can be limited by the first and second stoppers 425 and 436 as discussed above. If power is supplied to the second ring gear 431 by the second drive gear 435 and a power source when revolution of the second ring gear 431 is limited, not only the second ring gear 431 and the second drive gear 435 but also other related components can be damaged. For this reason, the second actuator 430 can further include a clutch configured to cut off the power supplied to the second ring gear 431 when rotation of the second ring gear 431 is limited. FIG. 11 is a cross-sectional view showing the clutch of the second actuator.

Referring to FIGS. 2 and 11, the clutch can be disposed on the second drive gear 435 of the second actuator 430 for effective power cutoff. The clutch can include a sleeve 435*a* engaged with the second ring gear 431. The sleeve 435*a* can have a hollow tubular shape. As shown, the sleeve 435*a* can be engaged with the second ring gear 431, more precisely, the second external gear 433, through the second drive gear 435 directly formed in a body of the sleeve 435*a*. In addition, the sleeve 435*a* can include a plurality of recesses 435*b* formed on an inner circumferential surface of the sleeve 435*a* at predetermined intervals, as shown in FIG. 11, and these recesses 435*b* can be generally oriented in parallel with a drive shaft of the second driving gear 435.

In some examples, the clutch can be connected to a power source, e.g., a motor, and can include a rotor 435*c* rotatably disposed within the sleeve 435*a*. The rotor 435*c* can include a plurality of ribs 435*d* extended radially from a hub of the rotor 435*c*. Since the ribs 435*d* are thin in thickness, the ribs 435*d* can be easily deformed elastically and likewise can be elastically inserted into the recesses 435*b*.

In some examples, when rotation of the second ring gear 431 is limited, a relative torque can be generated in a direction opposite to the rotation direction in the sleeve 435*a* engaged with the second ring gear 431. Due to this torque, the ribs 435*d* can be deformed and disengaged from the recesses 435*b* and such disengagement can be repeated. Therefore, while a relative torque is generated, i.e., while revolution of the second ring gear 431 is limited, the rotor 435*c* is idle in the sleeve 435*a* by disengagement of the ribs 435*d* and power may not be supplied to the sleeve 435*a* and the second ring gear 431 engaged with the sleeve 435*a*. Accordingly, if rotation of the second ring gear 431 is restricted, the clutch substantially disengages the power source from the second ring gear 431, thereby preventing the second ring gear 431 from being damaged.

Figure 12:
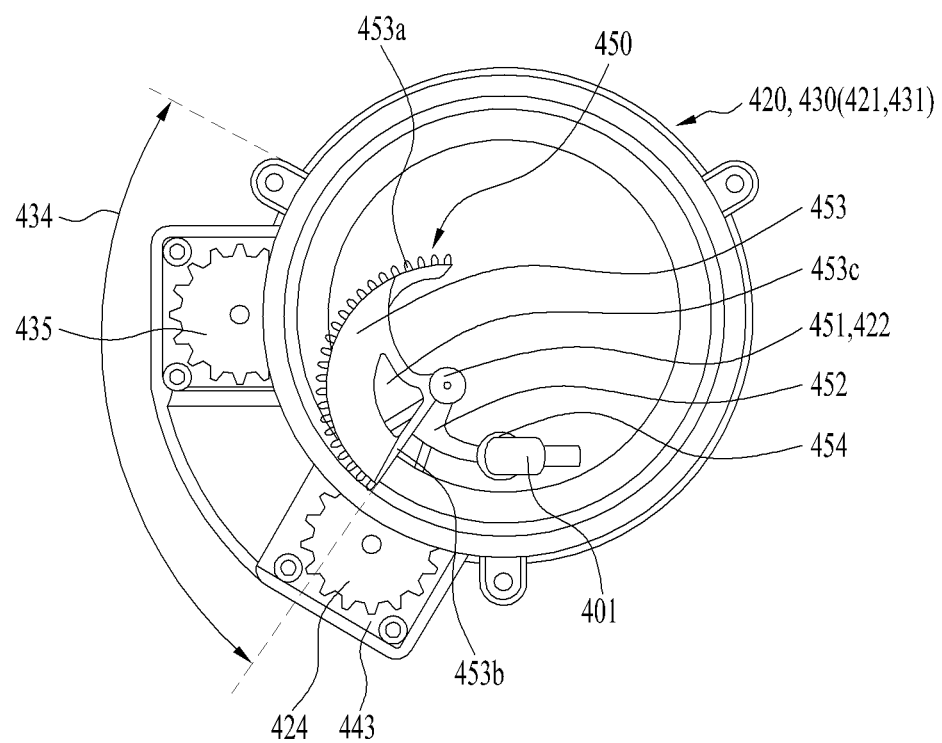
FIG. 12 is a plan view showing another example of the dispenser.

In some implementations, the dispenser 400 can be variously modified to improve functionality thereof. FIG. 12 is a plan view showing another example of the dispenser.

As shown in FIG. 12, an arm 450 according to the modified example can include a hinge 451 configured to function as a center of rotation. Unlike the hinge 411 of the arm 410 described above, the hinge 451 can be disposed to be separated from an inner circumferential portion of the first ring gear 421 by a predetermined interval and the shaft 422 of the first ring gear 421 can also be disposed to be separated from the inner circumferential portion in order to support the hinge 451. A second arm 453 between the hinge 451 and the second ring gear 431 can be formed to be large by the hinge 451 separated from the inner circumferential portion of the first ring gear 421. Accordingly, a pinion 453*a* can also be formed to be long and the internal gear 434 can also be correspondingly formed to be long. Accordingly, the second actuator 430 can more finely control rotation of the arm 450 by the long pinion 453*a* and the long internal gear 434.

The second arm 453 can include a rib 453*b* and an opening 453*c*, which are substantially the same as the ribs 413*b* and the opening 413*c* described above, so an additional description of the rib 453*b* and the opening 453*c* will be omitted below. Alternatively, since the hinge 451 greatly protrudes from the inner circumferential portion of the first ring gear 421, the first arm 452 may not be disposed to be opposite the second arm 453 and can be extended from the second arm 453 in a circumferential direction. A sleeve 454 is formed at an end of the first arm 452 and the nozzle 401 can be rotatably inserted into the first arm 452. In this way, since the first arm 452 is disposed at the second arm 453, the first arm 452 and the nozzle 401 may not interfere with surrounding components during motion despite the protruding hinge 451.

The effects of the coffee maker are as follows.

In the coffee maker, the dispenser can include first and second actuators each independently performing rotation and revolution of the nozzle. The dispenser can implement various motions of the nozzle having a high degree of freedom using these first and second actuators. Accordingly, the nozzle can move along a trajectory uniformly passing through all of coffee grounds in the coffee maker and water sprayed from the nozzle can uniformly contact the coffee grounds. Accordingly, high-quality coffee can be efficiently and effectively extracted. Since the nozzle can also move along various trajectories according to user intention, recipes for coffee extraction desired by the user can be implemented. For this reason, the coffee maker can have improved coffee extraction capability and expanded functionality.

Furthermore, the nozzle can be moved to avoid supplied coffee grounds by the first and second actuators. Therefore, the nozzle can be prevented from being clogged by the coffee grounds so that the reliability and stability of the coffee maker can be further improved.

The effects are not limited to what has been mentioned hereinabove and other effects not mentioned will be apparently and clearly understood by those skilled in the art from the description of the claims.

Although a number of representative examples are described above, it should be understood that numerous other modifications of these examples that fall within the spirit and scope of the principles of this disclosure can be devised by those skilled in the art. More particularly, various variations and modifications are possible within the scope of the disclosure, the drawings and the appended claims. In addition to variations and modifications, alternative uses will also be apparent to those skilled in the art.

What is claimed is:

1. A coffee maker, comprising:
   an extractor configured to receive ground coffee and water and to extract coffee from the ground coffee; and
   a dispenser configured to supply water to the ground coffee in the extractor,
   wherein the dispenser comprises:
   an arm assembly rotatably disposed vertically above an inlet of the extractor, the arm assembly comprising a nozzle configured to supply water to the ground coffee in the extractor,
   a first actuator configured to rotatably support the arm assembly and to rotate the arm assembly about a center of the inlet along an edge of the inlet, and a second actuator connected to the arm assembly and configured to rotate the arm assembly relative to the first actuator, wherein the arm assembly further comprises:
 a hinge rotatably coupled to the first actuator,
 a first arm that extends from the hinge and is coupled to the nozzle, and
 a second arm that extends from the hinge away from the first arm, the second arm being configured to pivot about the hinge by the second actuator, wherein the first actuator comprises a first ring gear disposed vertically above the edge of the inlet of the extractor, the first ring gear being configured to rotate about the center of the inlet, and wherein the first ring gear comprises:
 a shaft disposed at an inner circumferential portion of the first ring gear and rotatably coupled to the arm assembly, and
 a first external gear disposed at an outer circumferential portion of the first ring gear and coupled to a first power source, wherein the second actuator comprises a second ring gear disposed vertically above the first ring gear and configured to rotate about the center of the inlet, wherein the second ring gear comprises:
 an internal gear disposed at an inner circumferential portion of the second ring gear and engaged with the second arm, the internal gear being configured to pivot the second arm about the hinge; and
 a second outer gear disposed at an outer circumferential portion of the second ring gear and coupled to a second power source.

2. The coffee maker of claim 1, wherein the second actuator is configured to rotate the arm assembly about a point of the first actuator while the arm assembly rotates about the center of the inlet.

3. The coffee maker of claim 1, wherein the second actuator is configured to rotate together with the first actuator and to rotate the arm assembly about a point of the first actuator based on rotating in a same direction together with the first actuator.

4. The coffee maker of claim 1, wherein the second actuator is configured to rotate relative to the first actuator while rotating the arm assembly relative to the first actuator.

5. The coffee maker of claim 1, wherein the second ring gear is configured to rotate together with the first ring gear in a same direction.

6. The coffee maker of claim 1, wherein the first ring gear is configured to rotate about the center of the inlet at a first revolution speed, and
 wherein the second ring gear is configured to rotate about the center of the inlet relative to the first ring gear at a second revolution speed different from the first revolution speed, the second ring gear being configured to rotate the arm assembly about the hinge based on the relative rotation of the second ring gear with respect to the first ring gear.

7. The coffee maker of claim 6, wherein the first ring gear and the second ring gear are configured to rotate together in a first direction about the center of the inlet, and
 wherein the second ring gear is configured to, based on the second revolution speed being greater than the first revolution speed, rotate the arm assembly about the hinge in the first direction.

8. The coffee maker of claim 7, wherein the second ring gear is configured to, based on the second revolution speed being less than the first revolution speed, rotate the arm assembly about the hinge in a second direction opposite to the first direction.

9. The coffee maker of claim 1, wherein the first ring gear is configured to rotate about the center of the inlet at a first revolution speed in a first direction about the center of the inlet, and the second ring gear is configured to rotate about the center of the inlet at a second revolution speed in the first direction, and
 wherein the second ring gear is configured to:
  based on the second revolution speed being different from the first revolution speed, rotate the arm assembly about the hinge, and
  based on the second revolution speed being equal to the first revolution speed, not rotate the arm assembly about the hinge.

10. The coffee maker of claim 1, wherein the dispenser further comprises a tray configured to rotatably support the first actuator and the second actuator vertically above the inlet of the extractor.

11. The coffee maker of claim 10, further comprising a body that accommodates the extractor and the dispenser, wherein the tray is coupled to the body.

12. The coffee maker of claim 1, wherein the dispenser further comprises a restriction mechanism configured to limit rotation of the second ring gear relative to the first ring gear.

13. The coffee maker of claim 12, wherein the restriction mechanism comprises:
 a pair of first stoppers disposed at the second ring gear and spaced apart from each other; and
 a second stopper disposed at the first ring gear and arranged between the pair of first stoppers.

14. The coffee maker of claim 1, wherein the second actuator further comprises a clutch configured to cut off power supplied to the second ring gear based on rotation of the second ring gear being restricted.

15. The coffee maker of claim 14, wherein the clutch comprises:
 a sleeve engaged with the second ring gear, the sleeve defining a plurality of recesses at an inner circumferential surface of the sleeve; and
 a rotor that is rotatably disposed within the sleeve and connected to a power source, the rotor comprising a plurality of ribs that are configured to be inserted into the plurality of recesses.

16. The coffee maker of claim 15, wherein the plurality of ribs are made of an elastic material and configured to deform based on rotation of the second ring gear being restricted to thereby disengage with the plurality of recesses.

17. The coffee maker of claim 1, wherein the second actuator is configured to rotate the arm assembly to a position adjacent to the edge of the inlet of the extractor based on the ground coffee being supplied to the extractor.

18. A coffee maker, comprising:
 an extractor configured to receive ground coffee and water and to extract coffee from the ground coffee; and
 a dispenser configured to supply water to the ground coffee in the extractor,
 wherein the dispenser comprises:
  an arm assembly rotatably disposed vertically above an inlet of the extractor, the arm assembly comprising a nozzle configured to supply water to the ground coffee in the extractor,
  a first actuator configured to rotatably support the arm assembly and to rotate the arm assembly about a center of the inlet along an edge of the inlet, and a second actuator connected to the arm assembly and configured to rotate the arm assembly relative to the first actuator, wherein the arm assembly further comprises:
- a hinge rotatably coupled to the first actuator,
- a first arm that extends from the hinge and is coupled to the nozzle, and
- a second arm that extends from the hinge away from the first arm, the second arm being configured to pivot about the hinge by the second actuator, wherein the first actuator comprises a first ring gear disposed vertically above the edge of the inlet of the extractor, the first ring gear being configured to rotate about the center of the inlet, and wherein the first ring gear comprises:
- a shaft disposed at an inner circumferential portion of the first ring gear and rotatably coupled to the arm assembly, and
- a first external gear disposed at an outer circumferential portion of the first ring gear and coupled to a first power source.

19. The coffee maker of claim 18, wherein the second actuator comprises a second ring gear disposed vertically above the first ring gear and configured to rotate about the center of the inlet, and wherein the second ring gear comprises:
- an internal gear disposed at an inner circumferential portion of the second ring gear and engaged with the second arm, the internal gear being configured to pivot the second arm about the hinge; and
- a second outer gear disposed at an outer circumferential portion of the second ring gear and coupled to a second power source.

* * * * *